United States Patent
Kawatani (10) Patent No.: US 6,466,926 B1
(45) Date of Patent: Oct. 15, 2002

(54) METHOD FOR OPTIMIZING A RECOGNITION DICTIONARY TO DISTINGUISH BETWEEN PATTERNS THAT ARE DIFFICULT TO DISTINGUISH

(75) Inventor: Takahiko Kawatani, Yokohama (JP)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/142,328

(22) PCT Filed: Mar. 5, 1997

(86) PCT No.: PCT/US97/03387

§ 371 (c)(1),
(2), (4) Date: Jul. 12, 1999

(87) PCT Pub. No.: WO97/33250

PCT Pub. Date: Sep. 12, 1997

(30) Foreign Application Priority Data

Mar. 6, 1996 (JP) .............................................. 8-47850

(51) Int. Cl.[7] .................................................. G06N 5/02
(52) U.S. Cl. ........................................... 706/20; 705/28
(58) Field of Search ............................ 706/20; 705/28; 382/156

(56) References Cited

U.S. PATENT DOCUMENTS

| 4,414,629 A | * | 11/1983 | Waite ........................... 705/28 |
| 5,438,629 A | * | 8/1995 | Moed et al. ................. 382/156 |
| 5,638,491 A | * | 6/1997 | Moed ........................... 706/20 |

OTHER PUBLICATIONS

Johannes Gehrke, Wie–Yin Loh and Raghu Ramakrishnan; Classification and regression: money *can* grow on trees; Tutorial notes for ACM SIGKDD 1999 international conference on Knowledge discovery and data mining, Aug. 15–18, 1999, pp. 1–73.*

(List continued on next page.)

*Primary Examiner*—Wilbert L. Starks, Jr.

(57) ABSTRACT

A discriminant function is defined by conventional learning discriminant analysis (22) and a value of the discriminant function is calculated (23) for all the training patterns in the in-category pattern set of each category and for all the training patterns in the in-category rival pattern set of the category. The incategory pattern set is composed of all the training patterns defined as belonging to the category. The rival pattern set is composed of the training patterns that belong to other categories and that are incorrectly recognized as belonging to the category. An in-category pattern subset and a rival pattern subset are then formed (24) for each category. The in-category pattern subset for the category is formed by selecting a predetermined number of the training patterns that belong to the in-category pattern set and that, among the training patterns that belong to the in-category pattern set, have the largest values of the discriminant function. The rival pattern subset for the category is formed by selecting a predetermined number of the training patterns that belong to the rival pattern set of the category and that, among the training patterns that belong to the rival pattern set, have the smallest values of the discriminant function. A linear discriminant analysis operation is then performed (25) on the in-category pattern subset and the rival pattern subset to obtain parameters defining a new discriminant function. The reference vector and weighting vector stored in the recognition dictionary for the category are then modified using the parameters defining the new discriminant function.

21 Claims, 2 Drawing Sheets

OTHER PUBLICATIONS

Chris Faloutsos; Access methods for text; ACM Comput. Surv. 17, 1 (Mar. 1985), pp. 49–74.*

J. K. Wu, Y. H. Ang, P. C. Lam, S. K. Moorthy and A. D. Narasimhalu; Facial image retrieval, identification, and inference system; Proceedings of the first ACM international conference on Multimedia, 1993, pp. 47–55.*

Wendy L. Huxhold, Troy F. Henson and J. Dan Bowman; ANNIE: a simulated neural network for empirical studies and application prototyping; Proceedings of the 25th annual symposium on Simulation, 1992, pp. 2–8.*

Goodman, P.H.; Kaburlasos, V.G.; Egbert, D.D.; Carpenter, G.A.; Grossberg, S.; Reynolds, J.H.; Rosen, D.B.; Hartz, A.J. Fuzzy ARTMAP neural network compared to linear discriminant analysis prediction of the length of hospital stay in patients with pneumon.*

Qi Li; Tufts, D.W.; Duhaime, R.J.; August, P.V., Fast training algorithms for large data sets with application to classification of multispectral images, Signals, Systems and Computers, 1994. 1994 Conference Record of the Twenty–Eighth Asilomar Conference.*

Takahiko Kawatani, "Handprinted Numerals Recognition by Learning Distance Function", Systems and Computers in Japan, vol. 25, No. 10, Sep. 1, 1994, pp. 62–71.

D. Becker and J. Schurmann, "Zur verstarkten Berucksichtigung schlecht erkennbarer Zeichen in der Lernstichprobe", Wissenschaftliche Berichte Aeg–Telefunken, vol. 45, No. 1/2, 1972.

Takahiko Tawatani, "Handprinted Numeral Recognition with the Learning Quadratic Discriminant Function", Proceedings of the Second International Conference on DOcument Analysis and Recognition, Tsukuba Science City, Japan Oct. 20–22, 1993, pp. 14–17.

Takahiko Kawatani, "Handprinted Numeral Recognition with the Learning Distance Function", IAPR Technical Committee No. 11 on Text Processing, Center of Excellence for Document Analysis and Recognition, May 25–27, 1993.

* cited by examiner

METHOD FOR OPTIMIZING A RECOGNITION DICTIONARY TO DISTINGUISH BETWEEN PATTERNS THAT ARE DIFFICULT TO DISTINGUISH

TECHNICAL FIELD

The invention relates to pattern recognition methods, such as character recognition. In particular, the invention relates to a method that optimizes a recognition dictionary used in pattern recognition to enable the recognition dictionary to be able to better distinguish between patterns that are difficult to distinguish.

BACKGROUND OF THE INVENTION

Character recognition is typically implemented in the three stages that include preprocessing, feature extraction, and discrimination. During the preprocessing stage, size normalization of the input pattern and noise removal are performed. During the feature extraction stage, feature values that represent the shape of the character are extracted from each character pattern in the input pattern, and a feature vector representing the feature values is generated. Each feature represents a portion of the structure of the character pattern. Typical features include the length of stroke, the angle of stroke, and the number of loops. For example, when the feature is the number of loops, the feature may have one of the following values:

0: when the character pattern belongs to numeral "1", "2" or "3,"

1: when the character pattern belongs to numeral "0", "6" or "9," and

2: when the character pattern belongs to numeral "8."

Typically, many hundreds of feature values are extracted for each character pattern in the input pattern. The feature values are represented by a feature vector whose elements each represent the feature value of one of the features of the character pattern. A feature vector has a large number of dimensions, with 500 dimensions being typical.

During the discrimination stage, the feature vector of each character pattern in the input pattern is compared with a reference vector for each category. The character pattern is determined to belong to the category whose reference vector is closest to the feature vector of the character pattern. In character recognition, each category represents one character. For example, in numeral recognition, a category exists for each of the characters "0," "1,". . . , "9."

The reference vectors are stored in a recognition dictionary. The recognition dictionary is statistically created from character patterns obtained from the handwriting of many people. Such character patterns are called "training patterns." Before the character recognition system can be used for handwriting recognition, the recognition dictionary is created by a number of unspecified writers, where each writer provides a handwriting sample that includes a predetermined set of character patterns. The category to which each. of the character patterns in the set belongs is known. The feature vectors extracted from the character patterns in each category are averaged and each average vector is stored in the recognition dictionary as the reference vector for the category.

The effectiveness of a character recognition system is characterized by its recognition ratio. When character recognition is performed, one of the following results is obtained for each character pattern in the input pattern: (1) the category to which the character pattern belongs is correctly recognized; (2) the character pattern is successfully recognized as belonging to a category, but the character pattern is mis-read so that the category is incorrect; or (3) the character pattern is not recognized as belonging to any category. For example, when the character pattern is the numeral "1," result (1) occurs when the character pattern is recognized as belonging to the category "1," result (2) occurs when the character pattern is incorrectly recognized as belonging to the category "7," for example, and result (3) occurs when the category to which the character pattern belongs cannot be recognized. The recognition ratio is the number of character recognition events that generate result (1) divided by the total number of character patterns in the input pattern. A successful character recognition system is one that has a recognition ratio close to unity (or 100%).

Two basic approaches may be used to increase the recognition ratio of a character recognition system. These approaches are:

(1) to describe the distribution of the features of each category as precisely as possible; and (2) to emphasize the distribution differences between the categories.

Many known approaches to increasing the recognition ratio of character recognition systems concentrate on the first approach. These approaches have been successful, but only to a limited extent.

In *Handprinted Numerals Recognition by Learning Distance Function*, IEICE Trans. D-11, vol. J76-D-II, no. 9, pp. 1851–59 (September 1993), the inventor described Learning by Discriminant Analysis (LDA), a way of increasing the recognition ratio of character recognition systems based on the second approach. In particular, LDA increases the recognition ratio by reducing the number of incorrectly-recognized character patterns (result (2) above). In the LDA character recognition method, a discriminant function obtained by applying Fisher's linear discriminant analysis is superposed onto the original distance function between the feature vector of each character pattern in the input pattern and the reference vector of each category. The original distance function may be the weighted Euclidean distance or the quadratic discriminant function between the feature vector and the reference vectors.

Fisher's linear discriminant analysis is applied between the reference vector of each category and the feature vector of a rival pattern for the category. A rival pattern for category A, for example, is defined as a character pattern that belongs to a different category, e.g., category B, but is incorrectly recognized as belonging to category A. In this example, the rival pattern is incorrectly recognized as belonging to category A when the Euclidian distance between the feature vector of the rival pattern and the reference vector of category A is less than that between the feature vector of the rival pattern and the reference vector of category B, the category to which the rival pattern actually belongs.

In LDA, the linear discriminant analysis uses both the linear terms and the quadratic terms of the feature vector as linear terms. By applying the LDA pattern recognition method, multiple parameters in the distance function, such as the reference vector, the weighting vector and the constant term, can be determined at the same time. The use of the weighted Euclidean distance as the original distance function will be described in greater detail below.

The weighted Euclidean distance $D(x)$ between the feature vector of a character pattern and the reference vector of a category can be described as follows:

$$D(x) = \sum_{m=1}^{M} \omega_m (x_m - \mu_m)^2 \qquad (1)$$

where $x=(x_1, \ldots, x_M)^t$ represents the feature vector of the character pattern $\mu=(\mu_1, \ldots, \mu_M)^t$ represents the reference vector of the category, and $\omega=(\omega_1, \ldots, \omega_M)^t$ represents the weighting vector, and t denotes a transposition factor.

Subscripts denoting the index of the category have been omitted from equation (1) to simplify it.

To obtain the discriminant function F(x), LDA first performs a character recognition operation on an input pattern composed of a large set of training patterns. Each training pattern is determined to belong to the category for which the value of D(x) is lowest. The results of the character recognition operation are analyzed to identify, for each category, the training patterns that are incorrectly recognized as belonging to the category. The training patterns that are incorrectly recognized as belonging to a category constitute the rival pattern set for the category. The training patterns that are defined as belonging to each category constitute the in-category pattern set for the category. For example, training pattern x is defined as belonging to category A because the writer who wrote training pattern x did so in response to a request to write a pattern that belongs to category A. Membership of a training pattern in an in-category pattern set is independent of the recognition result of the character recognition operation.

LDA next applies linear discriminant analysis between the in-category pattern set of each category and its corresponding rival pattern set determined as just described. The linear discriminant analysis uses a 2M-dimensional vector y whose components are defined as:

$y_m = (x_m - \mu_m)^2$ $y_{M+m} = (x_m - \mu_m)$

The discriminant function F(x) can be written as follows:

$$F(x) = \sum_{m=1}^{M} a_m y_m + \sum_{m=1}^{M} b_m y_{M+m} + c \qquad (2)$$

$$= \sum_{m=1}^{M} a_m (x_m - \mu_m)^2 + \sum_{m=1}^{M} b_m (x_m - \mu_m) + c$$

It can be seen that the second form of F(x) is a quadratic equation of the form $ax^2+bx+c$.

The constant c always has a negative value. The way in which the coefficients $a_m$ and $b_m$ are determined will be described below.

The discriminant function F(x)<0 when the character pattern belongs to the category, and F(x)>0 when the character pattern belongs to the rival pattern set.

The modified Euclidian distance G(x) is defined as:

$$G(x) = D(x) + \gamma F(x) \qquad (3)$$

where $\gamma$ is a positive coefficient whose value is determined experimentally to maximize the recognition ratio when character recognition is performed using the modified Euclidian distance G(x).

By adding $\gamma F(x)$ to D(x), the original weighted Euclidian distance value is modified in such a manner that the distance between the feature vector of the character pattern and the reference vector of the category to which the character pattern belongs is reduced, and the distance between the feature vector of the character pattern and the reference vectors of the categories to which the character pattern does not belong is increased. This enables a character pattern that was incorrectly recognized when the original weighted Euclidian distance D(x) was used to be recognized correctly when the modified Euclidian distance G(x) is used.

G(x) can be written as:

$$G(x) = \sum_{m=1}^{M} \omega'_m (x_m - \mu'_m)^2 + d \qquad (4)$$

$$= \sum_{m=1}^{M} (\omega_m + \Delta\omega_m)(x_m - (\mu_m + \Delta\mu m))^2 + d$$

where:

$\Delta\omega = y a_m$ $\Delta\mu = -y b_m / 2(\omega_m + \Delta\omega_m)$ $\approx -y b_m / (2\omega_m)$ $d = yc + \sum_{m=1}^{M} d_m$, and $d_m = -\left(\frac{1}{4}\right) \sum_{m=1}^{M} (y b_m)^2 / (\omega_m + \Delta\omega_m)$ The form of the modified Euclidian distance function G(x) is the same as that of the original weighted Euclidian distance function D(x), except for the addition of the constant term d, and the m-th components of the reference vector and the weighting vector being modified by $\Delta\mu_m$ and $\Delta\omega_m$, respectively. This means that the parameters of the distance function can be learned using the rival pattern set for the category. The modified reference vectors, weighting vectors, and constant terms are stored in the recognition dictionary when determining G(x).

The quadratic coefficients $a_m$, $b_m$ and c that define F(x) are determined as follows. A vector a is defined as:

$a = (a_1, \ldots, a_M, b_1, \ldots, b_M)^t$ $a = \Sigma^{-1}(\mu_R - \mu_N)$ $c = a^t(\mu_R + \mu_N)/2$ where:

$\Sigma$ is the in-category covariance matrix for the vector y, $\mu_N$ the average feature vector, i.e., the reference vector, of the category, and $\mu_R$ is the average feature vector of the rival pattern set of the category.

The following is an example of the way in which $\Sigma$ may be defined:

$\Sigma = \{(n_S-1)S_S + (n_R-1)S_R\}/(n_S+n_R-2)$ where:

$S_S$ is the covariance matrix of the training patterns belonging to the category, $S_R$ is the covariance matrix of the training patterns constituting the rival pattern set of the category, $n_S$ is the number of training patterns belonging to the category, and $n_R$ is the number of training patterns constituting the rival pattern set.

Once values for the quadratic coefficients $a_m$, $b_m$ and c of F(x) have been calculated, the value of F(x) can then be calculated for each category.

The optimum value of $\gamma$ is determined by performing successive character recognition operations on the training patterns in the training pattern set using D(x), F(x) and a different value of $\gamma$, and determining the recognition ratio of each character recognition operation. The optimum value of $\gamma$ is that which gives the greatest recognition ratio.

The key to successfully using LDA is to determine F(x) correctly. To obtain F(x) using LDA, the pattern sets of two categories are projected onto the one dimensional axis z=F(x), and the discriminant function F(x) that maximizes the Fisher criterion is determined. The Fisher criterion is defined as the ratio of the squared distance $T^2$ between the averages of each category distribution on the z-axis to the within-category variance, which is defined as summation of each category variance $(s_1^2+s_2^2)$ on the z-axis, i.e., $T^2/(s_1^2+s_2^2)$.

One problem encountered when applying the above-described technique concerns the symmetry of the distributions of the pattern sets of the two categories when the pattern sets are projected onto the z-axis. It is believed that the pattern distribution on the z-axis cannot be symmetrical because the features used for character recognition are distributed asymmetrically. It is well known that many elements of the feature vectors used in character recognition are distributed with a positive skew rather than a negative skew. Even if the pattern sets of two categories are symmetrically distributed in the feature space, the linear discriminant analysis uses quadratic terms which cause asymmetric distributions on the z-axis.

This is illustrated by a simple example. Suppose that the pattern set of a given category is normally distributed with a covariance of 1. Consider the case of $a_m=1$ and $b_m=0$. In this case, F(x) represents the Euclidean distance, so that the distribution on the z-axis is equivalent to the distribution of the Euclidean distance. The probability density distribution of the Euclidean distance p(z) is expressed as:

$$p(z)=z^{(M-2)/2}e^{-z/2}/(2^{M/2}\Gamma(M/2)) \quad (5)$$

This formula is found in K. Fukunaga, *Introduction to Statistical Pattern Recognition*, Second Edition, Academic Press Inc. (1990). $\Gamma$ represents the gamma function. Equation (5) indicates that the probability density has a gamma distribution. The probability density of a gamma distribution is known to be asymmetric.

In the general case for arbitrary values of $a_m$ and $b_m$, it is difficult to determine the distribution analytically. However, it is thought that the distribution is never symmetric. When distributions are asymmetric on the z-axis, Fisher's criterion can be maximized for the total of all character patterns, but it is not necessarily maximized for character patterns that are easily confused, even though is highly desirable to distinguish between such character patterns. In other words, the original LDA technique does not generate an optimum discriminant function for character patterns that are easily confused, and the ability of the modified Euclidian distance G(x) generated by the original LDA technique to increase the recognition ratio of character recognition is therefore limited.

In Zur verstärkten Berücksichtigung schelcht erkennbarer Zeichen in der Lernstichtprobe, 45 WISSENSCHAFTLICHE BERICHTE AEG-TELEFUNKEN No. 1, 97-105, D. Becker and J. Schürmann describe a method for improving the effectiveness of the recognition dictionary of a non LDA-based character recognition system. In the character recognition system described by Becker et al., unlike in an LDA-based character recognition system, the effectiveness of the recognition dictionary depends entirely on the constituents of the training pattern set. Consequently, the method described in the article increases the effectiveness of the recognition dictionary by artificially generating a new training pattern set. The new training pattern set is generated by including an error sample composed of hard-to-recognize patterns in the existing training pattern set with increased weighting and generating a new recognition dictionary from the new training pattern set. The new recognition dictionary is generated by (1) using an existing recognition dictionary to perform a pattern recognition operation on the training pattern set; (2) forming an error sample composed of (a) all patterns from all categories misrecognized by the pattern recognition operation, and (b) some of the patterns nearly misrecognized by the pattern recognition operation; (3) modifying the training pattern set by including the members of the error sample with an increased weighting; (4) generating the new recognition dictionary using the modified training pattern set; and (5) repeating steps (1), (2), (3) and (4) using the new recognition dictionary in step (1) until the recognition ratio converges.

Unfortunately, there is nothing in the disclosure of Becker et al. that indicates that the method described therein could offer an effective solution to the above-mentioned asymmetrical distribution problem of LDA-based recognition systems.

It would be advantageous to provide a way of improving the discrimination ability of the discriminant function F(x) and the modified Euclidian distance G(x) by enabling Fisher's criterion to be maximized with respect to character patterns that are easily confused.

SUMMARY OF THE INVENTION

The invention solves the above problem by enabling Fisher's criterion to be maximized with respect to patterns that are easily confused, and therefore improves the discrimination ability of F(x) and G(x). As described above, formalizing the distribution on the z axis is difficult, and this problem is hard to solve analytically. To solve this problem, the invention provides the following method:

A discriminant function F(x) is defined by performing a conventional Learning by Discriminant Analysis operation and a value of the discriminant function is determined for all the training patterns in the in-category pattern set of each category and for all the training patterns in the rival pattern set of the category. The in-category pattern set is composed of all the training patterns defined as belonging to the category. The rival pattern set is composed of the training patterns that belong to other categories and that are incorrectly recognized as belonging to the category.

An in-category pattern subset and a rival pattern subset are then formed for each category. The in-category pattern subset for the category is formed by selecting a predetermined number of the training patterns that belong to the in-category pattern set and that, among the training patterns that belong to the in-category pattern set, have the largest values of the discriminant function F(x). The rival pattern subset for the category is formed by selecting a predetermined number of the training patterns that belong to the rival pattern set of the category and that, among the training patterns that belong to the rival pattern set, have the smallest values of the discriminant function F(x).

A linear discriminant analysis operation is then performed on the in-category pattern subset and the rival pattern subset to obtain a new discriminant function.

This processing increases the discrimination ability of the discriminant function. Consequently, a significant improvement in the pattern recognition ratio is achieved.

DETAILED DESCRIPTION OF THE INVENTION

Figure 1:
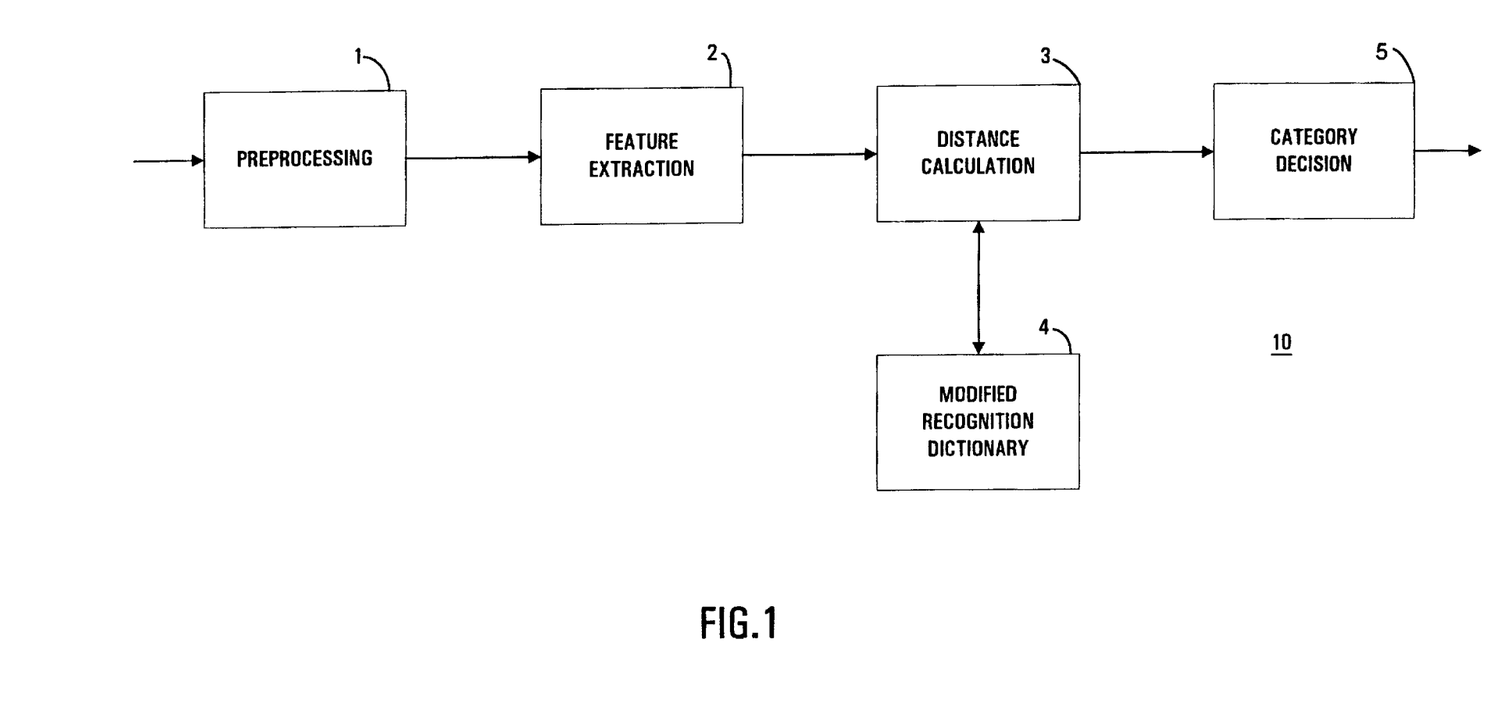
FIG. 1 is a block schematic diagram of a character recognition apparatus according to the invention.

FIG. 1 is a block schematic diagram of a character recognition apparatus according to the invention. In the character recognition apparatus 10, the preprocessing module 1 pre-processes an input pattern composed of multiple character patterns to normalize the position and size of each character pattern and to remove noise from the character pattern. The feature extraction module 2 extracts the features that will be used during the discrimination procedure from each pre-processed character pattern. The features of each character pattern are expressed as a feature vector for the character pattern. The distance calculation module 3 calculates the modified Euclidian distance between the feature vector of each character pattern and the modified reference vector of each category using a modified weighting vector and a constant. The modified reference vectors, modified weighting vectors and constants are stored in the modified recognition dictionary 4. The category decision module 5 receives the modified Euclidian distances determined by the distance calculation module and determines the category to which each character pattern in the input pattern belongs. The category to which each character pattern belongs is determined by identifying the category for which the value of the modified Euclidian distance is smallest. The category decision module then outputs the category determined for each character pattern as the category to which the character pattern belongs.

The apparatus just described is structurally similar to a conventional character recognition apparatus. However, the apparatus just described produces a higher recognition ratio than a conventional character recognition apparatus because, as will be described below, the modified reference vectors, modified weighting vectors, and constants stored in the modified recognition dictionary 4 are different from those stored in the recognition dictionary of a conventional character recognition apparatus.

Figure 2:
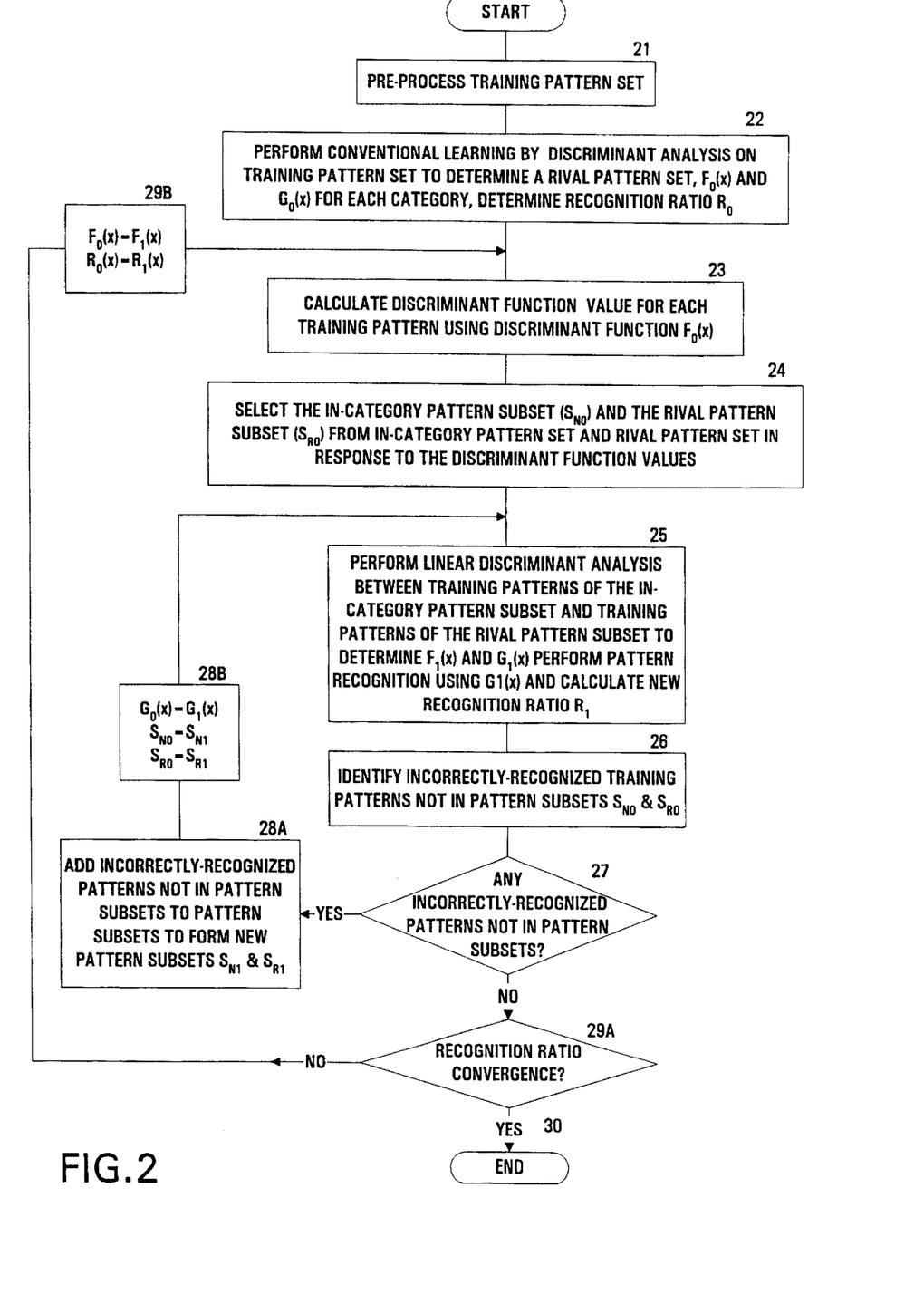
FIG. 2 is a flow diagram that shows the procedure according to the invention that is used to generate the recognition dictionary of the character recognition apparatus according to the invention.

The process according to the invention that is used to generate the modified reference vectors, modified weighting vectors and constants stored in the recognition dictionary 4 in the character recognition apparatus according to the invention will now be described with reference to the flow diagram shown in FIG. 2. The processing shown in FIG. 2 is performed using a training character set composed of training patterns generated in accordance with well-known training procedures. A training pattern is a character pattern whose category is known. Training patterns are generated by a large number of unspecified writers each providing a handwriting sample composed of a predetermined set of character patterns. The category to which each of the character patterns in the set belongs is known. The handwriting sample provided by each writer includes several character patterns in each category.

The processing shown in FIG. 2 may be performed in the character recognition apparatus 10 shown in FIG. 1. However, the processing shown in FIG. 2 is preferably performed in a separate computing apparatus. The results generated by the processing are then loaded into the character recognition apparatus where they are stored in the modified recognition dictionary 4. The functional elements used to perform the processing shown in FIG. 2 may be obtained by programming a general-purpose computer or digital signal processor circuit. Alternatively, suitable integrated circuits may be configured to provide the functional modules required to perform the processing shown in FIG. 2.

In step 21, the training pattern set is pre-processed to normalize the position and size of each training pattern and to remove noise from the training pattern. Then, the features are extracted from each training pattern and are expressed as a feature vector for the training pattern. As noted above, each feature vector has many dimensions, with 500 dimensions being typical.

In step 22, a conventional Learning by Discriminant Analysis (LDA) operation, similar to that described above, is applied to the training pattern set. The conventional LDA operation determines the discriminant function $F_0(x)$ for each category, defines the rival pattern set for the category, and calculates the modified Euclidian distance $G_0(x)$ for each category. The conventional LDA operation is performed as follows:

(a) A conventional character recognition operation is performed on the training pattern set. A weighted Euclidian distance $D(x)$ between the feature vector of each training pattern and the reference vector of each category is determined. Each training pattern is determined to belong to the category for which the value of $D(x)$ is smallest. In the conventional character recognition processing, a reference vector and weighting vector stored in a pre-existing conventional recognition dictionary for each category are used.

(b) The character recognition results generated by the conventional character recognition operation are compared with the known category of each training pattern to identify a rival pattern set for each category. The rival pattern set for each category is composed of the training patterns that are incorrectly recognized as belonging to the category. The training patterns defined as belonging to the category will be called the in-category pattern set for the category.

(c) For each category, the values of the quadratic coefficients $a_m$, $b_m$ and c that define the discriminant function $F_0(x)$ are determined, as described above, from the feature vectors of the in-category pattern set and the feature vectors of the rival pattern set.

(d) For each training pattern in the training pattern set, the value of the discriminant function $F_0(x)$ is determined from the values of the quadratic coefficients $a_m$, $b_m$ and c and the values of $x_m$ and $\mu_m$.

(e) The optimum value of $\gamma$ is then determined. For each training pattern in the training pattern set, a set of values of the modified: Euclidian distance $G_0(x)$ is calculated for each category. Each value of the modified Euclidian distance in the set is calculated using a different value of $\gamma$. Successive character recognition operations are performed on the training pattern set using the values of $G_0(x)$ corresponding to each value of $\gamma$. In the character recognition operations, each training pattern is determined to belong to the category for which the value of $G_0(x)$ is smallest. The recognition ratio of each character recognition operation is determined. The optimum value of $\gamma$ is that which gives the largest recognition ratio $R_0$. The optimum value is adopted as the value of $\gamma$.

Step 23 is the first step of a loop that optimizes the value of the current discriminant function $F_0(x)$. In step 23, a value of the current discriminant function $F_0(x)$ is calculated for each of the training patterns associated with each category. The training patterns associated with each category are the training patterns belonging to the in-category pattern set of the category and the training patterns belonging to the rival pattern set of the category.

The current discriminant function used in the calculations performed in step 23 is the most-recently determined discriminant function. Thus, the first time step 23 is executed, the initial discriminant function $F_0(x)$ determined in step 22 is used as the current discriminant function $F_0(x)$. In all subsequent executions of step 23, the new discriminant function $F_1(x)$ determined in the most recent execution of step 25 and adopted as the current discriminant function $F_0(x)$ in step 29A is used. The way in which the new discriminant function is determined in step 25 will be described below.

In step 24, the values of the current discriminant function $F_0(x)$ calculated in step 23 for all the training patterns associated with each category are examined to select the training patterns that will form two subsets of the training patterns. A predetermined number of the training patterns that belong to the incategory pattern set of the category and that have the largest values of the current discriminant function form the first of the subsets, the in-category pattern subset $S_{N0}$. A predetermined number of the training patterns that belong to the rival pattern set of the category and that have the smallest values of the current discriminant function form the second of the subsets, the rival pattern subset $S_{R0}$.

To select the training patterns for the in-category pattern subset $S_{N0}$ for the category, the training patterns of that belong to the in-category pattern set of the category may, for example, be arranged in descending order of the value of the current discriminant function, and the first p training patterns may be selected. To select the training patterns for the rival pattern subset $S_{R0}$ for the category, the training patterns that belong to the rival pattern set of the category may, for example, be arranged in ascending order of the value of the current discriminant function and the first p' training patterns may be selected.

The selection performed in step 24 selects the training patterns associated with each category that are likely to be confused with one another. The training patterns selected for the in-category pattern subset have the largest values of the discriminant function $F_0(x)$. The discriminant function $F_0(x)$ of the category has a maximum value for character patterns that are most distant to the reference vector of the category. The training patterns selected for the in-category pattern subset are those among the in-category set that have the largest values of the discriminant function. Thus, the training patterns selected for the in-category pattern subset are those in the in-category set that are most distant from the reference vector of the category, and that are therefore closest to the rival pattern set. On the other hand, the training patterns selected for the rival pattern subset are those among the rival pattern set that have the smallest values of the discriminant function. Thus, the training patterns selected for the rival pattern subset are those in the rival pattern set that are located closest to the reference vector of the category. Training patterns in the in-category pattern set that are most distant from the reference vector of their own category and training patterns in the rival pattern set that are the closest to the reference vector of the category are the training patterns that are most easily confused. The character recognition apparatus must be capable of correctly distinguishing between such easily-confused character patterns for the recognition ratio of the apparatus to be increased.

Step 25 is the first step of a loop that optimizes the value of the current modified Euclidian distance $G_0(x)$ by optimizing the membership of the in-category and rival pattern subsets. In step 25, a linear discriminant analysis operation is conducted for each category between the in-category pattern subset of the category and the rival pattern subset of the category. The linear discriminant analysis operation is performed using a procedure similar to that described above with reference to substeps (c)–(e) of step 22. The linear discriminant analysis operation determines a new discriminant function $F_1(x)$, and a new modified Euclidian distance $G_1(x)=G_0(x)+\gamma F_1(x)$.

In determining the new modified Euclidian distance, the value of $\gamma$ is selected using the procedure described above with reference to substep (e) of step 22. The value of $\gamma$ chosen its that which maximizes the new recognition ratio $R_1$ obtained using the new modified Euclidian distance $G_1(x)$.

In step 26, a review is carried out on the results of the character recognition operation that provided the maximizum value of the new recognition ratio $R_1$ in the previous step. The review identifies the training patterns were incorrectly recognized by the character recognition operation and that are not already members of an appropriate pattern subset. For example the review identifies the training patterns that actually belong to category A but which the character recognition operation determined o belong to category B, and that do not belong to the current in-category pattern subset $S_{N0}$ of category A, or to the current rival pattern subset $S_{R0}$ of category B.

In the processing performed in step 26, the current pattern subsets are the most-recently determined pattern subsets. In the first iteration of the loop that begins with step 25, the current pattern subsets are the pattern subsets formed in step 24. In the second and subsequent iterations of this loop, the current pattern subsets are the new pattern subsets formed in step 28A in the previous iteration of the loop and adopted as the current pattern subsets in step 28B.

Step 27 determines whether the review performed in step 26 identified any training patterns as being incorrectly recognized and not belonging to an appropriate pattern subset. If the result in step 27 is YES, execution passes to step 28A, which will be described next. Otherwise, execution passes to step 29, which will be described below.

In step 28A, each training pattern that was identified in step 26 as an incorrectly-recognized training pattern, and that does not belong to an appropriate current in-category pattern subset $S_{N0}$ or to an appropriate current rival pattern subset $S_{R0}$, is processed. If the incorrectly-recognized training pattern is not already a member of the in-category pattern subset $S_{N0}$ for the category to which the pattern belongs, it is added to this subset to form the new in-category pattern subset $S_{N1}$. Additionally or alternatively, if the incorrectly-recognized training pattern is not already a member of the rival pattern subset $S_{R0}$ for the category to which the pattern was incorrectly recognized as belonging, it is added to this subset to form a new rival pattern subset $S_{R1}$.

For example, if the incorrectly-recognized pattern actually belongs to category A but was incorrectly recognized in step 25 as belonging to category B, and the incorrectly-recognized training pattern is not already a member of the in-category pattern subset $S_{N0}$ for category A, the category to which the pattern actually belongs, this training pattern is added to the incategory pattern subset for category A to form the new in-category pattern subset $S_{N1}$ for category A. Additionally or alternatively, an incorrectly-recognized pattern that actually belongs to category B but was incorrectly recognized in step 25 as belonging to category A and that is not already a member of the rival pattern subset $S_{R0}$ of category A is added to the rival pattern subset of category A to form the new rival pattern subset $S_{R1}$ for category A.

Execution then passes to step 28B, where the new in-category pattern subset $S_{N1}$ is adopted as the current in-category pattern subset $S_{N0}$, the new rival pattern subset $S_{R1}$ is adopted as the current rival pattern subset $S_{R0}$, and the new modified Euclidian distance $G_1(x)$ determined in the previous iteration of step 25 is adopted as the current modified Euclidian distance $G_0(x)$. Execution then returns to step 25.

When a NO result is obtained in step 27, execution passes to step 29A which determines whether the recognition ratio has converged. This may be done by subtracting the current recognition ratio $R_0$ from the new recognition ratio $R_1$. Convergence is detected by determining whether the resulting difference $R_1-R_0$ is less than a predetermined limit.

If the recognition result has not converged, a NO result is generated in step 29A, and execution returns to step 23 via step 29B, which will be described next. Otherwise, execution passes to step 30, which will be described below.

In step 29B, the new discriminant function $F_1(x)$ determined in the most recent execution of step 25 is adopted as the current discriminant function $F_0(x)$, and the new recognition ratio $R_1$ determined in the most recent execution of step 26 is adopted as the current recognition ratio $R_0$. Steps 23–29A are then repeated at least once.

If the recognition result has converged in step 29A, a YES result is generated and execution passes to step 30, where processing ends. The end of processing leaves the values of γ, $a_m$, $b_m$ and c used in equation 4 above to calculate the current modified Euclidian distance $G_0(x)$ for each category stored in memory locations that can be accessed by the distance calculation module 3 of the character recognition apparatus shown in FIG. 1.

Alternatively, the values of γ, $a_m$, $b_m$ and c used in equation 4 above to calculate the current modified Euclidian distance $G_0(x)$ for each category can be transferred to the character recognition apparatus shown in FIG. 1. These values can be used to modify the conventional reference vectors and weighting vectors to generate the modified reference vectors, modified weighting vectors and constants that are stored in the modified recognition dictionary 4. As a further alternative, the values of γ, $a_m$, $b_m$ and c used in equation 4 above to calculate the current modified Euclidian distance $G_0(x)$ for each category can be used to modify the reference vector, and weighting vector for each category stored in the conventional reference dictionary used in step 22(a), and the resulting modified reference vectors, modified weighting vectors and constants can be transferred to the modified recognition dictionary 4 of the character recognition apparatus shown in FIG. 1. The modified reference vectors, modified weighting vectors and constants can be stored in the modified recognition dictionary. Any of these alternatives enables the character recognition apparatus 10 shown in FIG. 1 to perform character recognition using the current modified Euclidian distance $G_0(x)$ instead of a conventional modified Euclidian distance $G(x)$ or a conventional Euclidian distance $D(x)$.

When character recognition is performed using a modified recognition dictionary generated using the method according to the invention, the negative effects of the asymmetry of the distribution on the discrimination axis in learning by discriminant analysis are reduced, and the recognition accuracy is markedly improved. Character recognition using a modified recognition dictionary generated by one embodiment of the invention was tested using the handwritten characters included in the SD19 database published by the National Institute of Standards and Technology (NIST). A character recognition using a conventional recognition dictionary generated using conventional LDA gave a 99.75% recognition ratio on this data base. In contrast, a 99.87% recognition ratio was achieved when the modified recognition dictionary generated by the invention was used.

Although this disclosure describes illustrative embodiments of the invention in detail, it is to be understood that the invention is not limited to the precise embodiments described, and that various modifications may be practiced within the scope of the invention defined by the appended claims.

I claim:

1. A method of generating a recognition dictionary that stores a reference vector and weighting vector for each of plural categories, the recognition dictionary being for use in a pattern recognition operation, the method optimizing the recognition dictionary to distinguish between patterns that are difficult to distinguish, and comprising steps of:

providing a training pattern set including training patterns;

for each category, performing a Learning by Discriminant Analysis (LDA) operation to define a discriminant function for the category, the LDA operation including:

performing a pattern recognition operation on the training patterns to define a rival pattern set composed of ones of the training patterns that belong to other categories but are misrecognized as belonging to the category, performing a linear discriminant analysis between the rival pattern set and an in-category pattern set composed of ones of the training patterns defined as belonging to the category to generate the discriminant function, and performing pattern recognition operations using the discriminant function and different values of a multiplier to determine a value of the multiplier that provides a greatest recognition ratio;

calculating a value of the discriminant function for each of the training patterns belonging to the in-category pattern set and for each of the training patterns belonging to the rival pattern set to generate a respective discriminant function value;

in response to the discriminant function values, selecting training patterns from the in-category pattern set to form an in-category pattern subset, and selecting training patterns from the rival pattern set to form a rival pattern subset, the training patterns selected to form the in-category subset and the rival pattern subset being training patterns that are difficult to distinguish;

performing a linear discriminant analysis between the training patterns belonging to the in-category pattern subset and the training patterns belonging to the rival pattern subset to generate parameters defining a new discriminant function for the category; and modifying the reference vector and weighting vector stored in the recognition dictionary for the category using the parameters defining the new discriminant function.

2. The method of claim 1, in which the step of selecting training patterns from the in-category pattern set to form an in-category pattern subset, and selecting training patterns from the rival pattern set to form a rival pattern subset includes steps of:

selecting the training patterns having the largest discriminant function values in the in-category pattern set to form the in-category pattern subset; and     selecting the training patterns having the smallest discriminant function values in the rival pattern set to form the rival pattern subset.

3. The method of claim 2, in which:

(a) the step of performing a linear discriminant analysis includes a step of performing a pattern recognition operation on the training pattern set using the parameters defining the new discriminant function;

(b) the method additionally comprises steps of:
    (1) identifying the training patterns that were incorrectly recognized by the pattern recognition operation as belonging to each category,
    (2) forming a new in-category pattern subset and a new rival pattern subset for the category,
        the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
        the new rival pattern subset being formed by adding, to the rival pattern subset for the category, the training patterns belonging to other categories that were incorrectly recognized by the pattern recognition operation as belonging to the category, and that are not currently members of the rival pattern subset;

(c) the steps of:
    (1) performing the linear discriminant analysis and the pattern recognition operation using the parameters defining the new discriminant function,
    (2) identifying the training patterns that were incorrectly recognized, and
    (3) forming a new in-category pattern subset and a new rival pattern subset for the category, constitute a loop; and (d) the method additionally comprises a step of repetitively executing the loop, the step of performing a linear discriminant analysis being performed in each execution of the loop between the new in-category pattern subset and the new rival pattern subset formed in the previous execution of the loop.

4. The method of claim 3, in which:

the loop additionally includes a step of determining when all of the training patterns incorrectly recognized by the pattern recognition operation are included in the pattern subsets; and the step of repetitively executing the loop includes repetitively executing the loop until the step of determining when all of the incorrectly recognized training patterns are included in the pattern subsets determines that all of the incorrectly recognized training patterns are included in the pattern subsets.

5. The method of claim 2, in which:

(a) the step of performing a linear discriminant analysis includes steps of:
    (1) performing a pattern recognition operation on the training pattern set using the parameters defining the new discriminant function, the pattern recognition operating generating a pattern recognition result, and
    (2) determining a recognition ratio for the pattern recognition result generated by the pattern recognition operation;

(b) the steps of:
    (1) calculating the value of the discriminant function,
    (2) selecting training patterns to form the in-category pattern subset and selecting training patterns to form the rival pattern subset, and
    (3) performing a linear discriminant analysis, the pattern recognition operation using the parameters defining the new discriminant function, and determining the recognition ratio, constitute a loop; and (c) the method additionally comprises repetitively executing the loop until the recognition ratios determined in consecutive executions of the loop converge, the parameters determined in the step of performing the additional discriminant analysis in each execution of the loop defining the discriminant function whose value is calculated in the step of calculating the value of the discriminant function in the next execution of the loop.

6. The method of claim 5, in which:

(a) the method additionally comprises:
    (1) identifying the training patterns that were incorrectly recognized by the pattern recognition operation as belonging to each category,
    (2) forming a new in-category pattern subset and a new rival pattern subset for the category,
        the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
        the new rival pattern subset being formed by adding, to the rival pattern subset for the category, the training patterns belonging to other categories that were incorrectly recognized by the pattern recognition operation as belonging to the category, and that are not currently members of the rival pattern subset;

(b) the steps of:
    (1) performing a linear discriminant analysis, and the pattern recognition operation using the parameters defining the new discriminant function,
    (2) identifying the training patterns that were incorrectly recognized, and
    (3) forming a new in-category pattern subset and a new rival pattern subset for the category, constitute a second loop, and (c) the method additionally comprises a step of repetitively executing the second loop, the step of performing a linear discriminant analysis being performed in each execution of the second loop between the new in-category pattern subset and the new rival pattern subset formed in the previous execution of the second loop.

7. The method of claim 6, in which:

the second loop additionally includes a step of determining when all of the training patterns incorrectly recognized by the pattern recognition operation are included in the pattern subsets; and the step of repetitively executing the second loop includes repetitively executing the second loop until the step of determining when all of the incorrectly-recognized training patterns are included in the pattern subsets determines that all of the incorrectly-recognized training patterns are included in the pattern subsets.

8. The method of claim 2, in which the linear discriminant analyses performed in the step of performing the Learning by Discriminant Analysis operation and in the step of performing a linear discriminant analysis each generate a discriminant function that includes linear and quadratic terms.

9. The method claim 8, in which:
(a) the step of performing a linear discriminant analysis includes a step of performing a pattern recognition operation on the training pattern set using the parameters defining the new discriminant function;
(b) the method additionally comprises steps of:
  (1) identifying the training patterns that were incorrectly recognized by the pattern recognition operation as belonging to each category,
  (2) forming a new in-category pattern subset and a new rival pattern subset for the category,
    the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
    the new rival pattern subset being formed by adding, to the rival pattern subset for the category, the training patterns belonging to other categories that were incorrectly recognized by the pattern recognition operation as belonging to the category, and that are not currently members of the rival pattern subset;
(c) the steps of:
  (1) performing the linear discriminant analysis and the pattern recognition operation using the parameters defining the new discriminant function,
  (2) identifying the training patterns that were incorrectly recognized, and
  (3) forming a new in-category pattern subset and a new rival pattern subset for the category,
constitute a loop; and
(d) the method additionally comprises a step of repetitively executing the loop, the step of performing a linear discriminant analysis being performed in each execution of the loop between the new in-category pattern subset and the new rival pattern subset formed in the previous execution of the loop.

10. The method of claim 9, in which,
the loop additionally includes a step of determining when all of the training patterns incorrectly recognized by the pattern recognition operation are included in the pattern subsets; and
the step of repetitively executing the loop includes repetitively executing the loop until the step of determining when all of the incorrectly recognized training patterns are included in the pattern subsets determines that all of the incorrectly recognized training patterns are included in the pattern subsets.

11. The method of claim 8, in which:
(a) the step of performing a linear discriminant analysis includes steps of:
  (1) performing a pattern recognition operation on the training pattern set using the parameters defining the new discriminant function, the pattern recognition operating generating a pattern recognition result, and
  (2) determining a recognition ratio for the pattern recognition result generated by the pattern recognition operation;
(b) the steps of:
  (1) calculating the value of the discriminant function,
  (2) selecting training patterns to form the in-category pattern subset and selecting training patterns to form the rival pattern subset, and
  (3) performing a linear discriminant analysis, the pattern recognition operation using the parameters defining the new discriminant function, and determining the recognition ratio,
constitute a loop; and
(c) the method additionally comprises repetitively executing the loop until the recognition ratios determined in consecutive executions of the loop converge, the parameters determined in the step of performing the additional discriminant analysis in each execution of the loop defining the discriminant function whose value is calculated in the step of calculating the value of the discriminant function in the next execution of the loop.

12. The method of claim 11, in which;
(a) the method additionally comprises:
  (1) identifying the training patterns that were incorrectly recognized by the pattern recognition operation as belonging to each category,
  (2) forming a new in-category pattern subset and a new rival pattern subset for the category,
    the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
    the new rival pattern subset being formed by adding, to the rival pattern subset for the category, the training patterns belonging to other categories that were incorrectly recognized by the pattern recognition operation as belonging to the category, and that are not currently members of the rival pattern subset;
(b) the steps of:
  (1) performing a linear discriminant analysis, and the pattern recognition operation using the parameters defining the new discriminant function,
  (2) identifying the training patterns that were incorrectly recognized, and
  (3) forming a new in-category pattern subset and a new rival pattern subset for the category,
constitute a second loop, and
(c) the method additionally comprises a step of repetitively executing the second loop, the step of performing a linear discriminant analysis being performed in each execution of the second loop between the new in-category pattern subset and the new rival pattern subset formed in the previous execution of the second loop.

13. The method of claim 12, in which:
the second loop additionally includes a step of determining when all of the training patterns incorrectly recognized by the pattern recognition operation are included in the pattern subsets; and
the step of repetitively executing the second loop includes repetitively executing the second loop until the step of determining when all of the incorrectly-recognized training patterns are included in the pattern subsets determines that all of the incorrectly-recognized training patterns are included in the pattern subsets.

14. The method of claim 1, in which:
(a) the step of performing a linear discriminant analysis includes steps of:
   (1) performing a pattern recognition operation on the training pattern set using the parameters defining the new discriminant function, the pattern recognition operating generating a pattern recognition result, and
   (2) determining a recognition ratio for the pattern recognition result generated by the pattern recognition operation;
(b) the steps of
   (1) calculating the value of the discriminant function,
   (2) selecting training patterns to form the in-category pattern subset and selecting training patterns to form the rival pattern subset, and
   (3) performing a linear discriminant analysis, the pattern recognition operation using the parameters defining the new discriminant function, and determining the recognition ratio,
constitute a loop; and
(c) the method additionally comprises repetitively executing the loop until the recognition ratios determined in consecutive executions of the loop converge, the parameters determined in the step of performing the additional discriminant analysis in each execution of the loop defining the discriminant function whose value is calculated in the step of calculating the value of the discriminant function in the next execution of the loop.

15. The method of claim 14, in which:
(a) the method additionally comprises:
   (1) identifying the training patterns that were incorrectly recognized by the pattern recognition operation as belonging to each category,
   (2) forming a new in-category pattern subset and a new rival pattern subset for the category,
      the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
      the new rival pattern subset being formed by adding, to the rival pattern subset for the category, the training patterns belonging to other categories that were incorrectly recognized by the pattern recognition operation as belonging to the category, and that are not currently members of the rival pattern subset;
(b) the steps of:
   (1) performing a linear discriminant analysis, and the pattern recognition operation using the parameters defining the new discriminant function,
   (2) identifying the training patterns that were incorrectly recognized, and
   (3) forming a new in-category pattern subset and a new rival pattern subset for the category,
constitute a second loop, and
(c) the method additionally comprises a step of repetitively executing the second loop, the step of performing a linear discriminant analysis being performed in each execution of the second loop between the new in-category pattern subset and the new rival pattern subset formed in the previous execution of the second loop.

16. The method of claim 15, in which:
the second loop additionally includes a step of determining when all of the training patterns incorrectly recognized by the pattern recognition operation are included in the pattern subsets; and
the step of repetitively executing the second loop includes repetitively executing the second loop until the step of determining when all of the incorrectly-recognized training patterns are included in the pattern subsets determines that all of the incorrectly-recognized training patterns are included in the pattern subsets.

17. The method of claim 1, in which the linear discriminant analyses performed in the step of performing the Learning by Discriminant Analysis operation and in the step of performing a linear discriminant analysis each generate a discriminant function that includes linear and quadratic terms.

18. The method of claim 17, in which:
(a) the step of performing a linear discriminant analysis includes a step of performing a pattern recognition operation on the training pattern set using the parameters defying the new discriminant function;
(b) the method additionally comprises steps of:
   (1) identifying the training patterns that were incorrectly recognized by the pattern recognition operation as belonging to each category,
   (2) forming a new in-category pattern subset and a new rival pattern subset for the category,
      the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
      the new rival pattern subset being formed by adding, to the rival pattern subset for the category, the training patterns belonging to other categories that were incorrectly recognized by the pattern recognition operation as belonging to the category, and that are not currently members of the rival pattern subset;
(c) the steps of:
   (1) performing the linear discriminant analysis and the pattern recognition operation using the parameters defining the new discriminant function,
   (2) identifying the training patterns that were incorrectly recognized, and
   (3) forming a new in-category pattern subset and a new rival pattern subset for the category,
constitute a loop; and
(d) the method additionally comprises a step of repetitively executing the loop, the step of performing a linear discriminant analysis being performed in each execution of the loop between the new in-category pattern subset and the new rival pattern subset formed in the previous execution of the loop.

19. The method of claim 18, in which:
the loop additionally includes a step of determining when all of the training patterns incorrectly recognized by the pattern recognition operation are included in the pattern subsets; and
the step of repetitively executing the loop includes repetitively executing the loop until the step of determining when all of the incorrectly recognized training patterns are included in the pattern subsets determines that all of the incorrectly recognized training patterns are included in the pattern subsets.

20. The method of claim 1, in which:
(a) the step of performing a linear discriminant analysis includes a step of performing a pattern recognition operation on the training pattern set using the parameters defining the new discriminant function;
(b) the method additionally comprises steps of:
  (1) identifying the training patterns that were incorrectly recognized by the pattern recognition operation as belonging to each category,
  (2) forming a new in-category pattern subset and a new rival pattern subset for the category,
    the new in-category pattern subset being formed by adding, to the in-category pattern subset for the category, the training patterns belonging to the category that were incorrectly recognized by the pattern recognition operation as belonging to other categories, and that are not currently members of the in-category pattern subset,
    the new rival pattern subset being formed by adding, to the rival pattern subset for the category, the training patterns belonging to other categories that were incorrectly recognized by the pattern recognition operation as belonging to the category, and that are not currently members of the rival pattern subset;
(c) the steps of:
  (1) performing the linear discriminant analysis and the pattern recognition operation using the parameters defining the new discriminant function,
  (2) identifying the training patterns that were incorrectly recognized, and
  (3) forming a new in-category pattern subset and a new rival pattern subset for the category,
constitute a loop; and
(d) the method additionally comprises a step of repetitively executing the loop, the step of performing a linear discriminant analysis being performed in each execution of the loop between the new in-category pattern subset and the new rival pattern subset formed in the previous execution of the loop.

21. The method of claim 20, in which:
the loop additionally includes a step of determining when all of the training patterns incorrectly recognized by the pattern recognition operation are included in the pattern subsets; and
the step of repetitively executing the loop includes repetitively executing the loop until the step of determining when all of the incorrectly recognized training patterns are included in the pattern subsets determines that all of the incorrectly recognized training patterns are included in the pattern subsets.

* * * * *